Patented Nov. 6, 1951

2,574,439

UNITED STATES PATENT OFFICE 2,574,439

PLASTICIZED POLYSTYRENE COMPOSITION

Raymond B. Seymour, Dayton, Ohio, assignor to Monsanto Chemical Company, St. Louis, Mo., a corporation of Delaware No Drawing. Application June 11, 1945, Serial No. 598,896

3 Claims. (Cl. 260—45.5)

1

The present invention deals with polystyrene compositions and relates particularly to a new plasticized polystyrene and to a method for producing the same.

While various plasticizers have been added to polystyrene, a satisfactory product has not been obtained in this way in spite of a large number of attempts to obtain a flexible product by the incorporation of many different compatible high-boiling materials. In general, the addition of plasticizers yields tacky materials possessing abnormally low tensile strengths. The greatest difficulty, however, resides in the fact that plasticized polystyrene resins possess low strength and tend to lose the plasticizer.

An object of the present invention is the provision of new plasticized polystyrene resins, which materials possess a high strength, flexibility, clarity and toughness and in which the plasticizing effect will be substantially permanent.

These and other objects which will be hereinafter disclosed are provided by the following invention whereby there is provided polystyrene resins which have been plasticized by incorporating therein certain proportions of copolymers obtained by polymerizing by an emulsion process a mixture comprising a major proportion of styrene and a minor proportion of butadiene or isoprene. Copolymers of butadiene or isoprene and styrene are most widely known in the rubbery form, such materials being obtainable by polymerization of a mixture comprising a major proportion of butadiene and a minor proportion of styrene. However, non-rubbery copolymers of butadiene compounds and styrene are also known in the prior art. Such materials are obtained by polymerization of a mixture comprising a major proportion of styrene and a minor proportion of a butadiene. While they are of interest because they form a class of highly flexible, moldable, plastic materials they are of limited value because of their very low tensile strengths.

I have now found that when I incorporate from 40% to 90% by weight of polystyrene with from 60% to 10% by weight of an emulsion formed styrene—conjugated diene interpolymer, wherein the diene is selected from the class consisting of butadiene-1,3 and isoprene, the composition of the interpolymer being maintained within the limits of 60% to 80% by weight of styrene and 40% to 20% of the said diene, that the composition exhibits a much higher tensile strength than when other known plasticizers are employed. The compositions so obtained, while

2 not quite as high in tensile strength as polystyrene itself, are sufficiently strong to produce valuable resinous products for many of those purposes for which polystyrene is now employed. The polystyrene composition hereby provided possesses in addition a desirable elongation which is considerably greater than that of polystyrene itself. A considerable degree of flexibility is also possessed by my compositions which enables these compositions to be employed for the manufacture of tough, flexible sheets and foils.

For the production of polystyrene which is to be plasticized by means of the interpolymer, any method of polymerization may be employed. In other words, polymerization of the styrene may be carried out in mass, in solution or in emulsion.

The interpolymer of styrene and butadiene must, however, be formed by emulsion polymerization methods in order to obtain the favorable tensile and flexibility values desired. Any emulsification polymerization process may be employed. For the present purpose styrene and butadiene or isoprene are combined in any proportion within the range of 60% to 80% by weight of styrene with from 40% to 20% of butadiene or isoprene, the mixture of polymerizable hydrocarbons being emulsified in an aqueous medium and then polymerized by heating while so emulsified.

After polymerization has been carried to completion the polymers may be recovered from the medium in which they were formed and then combined in the proportions indicated above. Such combination may be effected by any means known to the art.

When polymerization of the styrene has been carried out in a dispersed phase, as in solution or in emulsion, the polystyrene need not be separately recovered from the dispersing medium, but the dispersed phase containing the polymer may be combined with the emulsion polymerized interpolymer in any manner known to the art and in this way a mixed emulsion obtained.

In cases where the polystyrene resin has been formed by polymerization in mass, the hard styrene resin may be ground, mixed with the emulsion formed interpolymer by mechanical means and then worked on rubber milling rolls until a uniform product has been obtained. If desirable, the hard, resinous polystyrene and the interpolymer formed by emulsion polymerization may be dissolved in solvents, the solutions combined in the desired proportions and the resinous mixture precipitated by pouring the solution into a non-solvent such as any of the lower alcohols. The precipitate thrown down by this treatment is recovered by filtration, washed and dried, and being in a finely divided form may conveniently be used in this form.

When emulsions of both the polystyrene and the interpolymer are obtained they may be combined in the proportions herein disclosed and for many purposes may be employed without precipitation of the resinous material. For example, the mixed emulsions may be used directly for the production of films and coatings, treatment of textile material, cellulosic materials or the like in order to obtain various novel effects.

Of particular value for the production of compositions where a high elongation combined with a high tensile strength is desired, I have found that if the above compositions are somewhat more restricted so as to contain from 50% to 60% of polystyrene with from 50% to 40% of an interpolymer, which interpolymer consists of between 75% to 60% of styrene and from 25% to 40% by weight of a conjugated diene selected from the class consisting of butadiene and isoprene, compositions having elongations in the range from 180% to 885% with tensile strengths above 3,000 pounds per square inch may be obtained.

Since my invention is based upon the discovery of the plasticizing effect, as distinguished from a molecular interpolymerization of the polystyrene with the particular styrene-diene interpolymer, it is desirable that both the polystyrene and the interpolymer be substantially free of monomeric materials. Accordingly, in cases where the polystyrene or the styrene-diene interpolymer, after formation, are found to contain appreciable quantities of monomeric materials, such materials should be removed from the polymeric bodies as by distillation or by solvent purification. Of these methods, steam distillation will generally be found to be the most convenient method for removing non-polymerized monomeric materials, although other known methods may also be employed.

When the polystyrene resin and the styrene-diene interpolymer are thus freed of monomeric materials, they may be combined as herein described with the assurance that no chemical or molecular interpolymerization will thereafter take place and destroy the favorable properties of the herein described compositions.

The present plasticized polystyrenes in appearance vary from light tan to colorless, clear, transparent, hard, resinous materials which are characterized by pronounced flexibility and toughness. They may be shaped into diverse objects either by compression or injection molding procedures to yield smooth, lustrous objects of good form stability. They possess very good electrical properties and are unaffected by water. The present products are thus particularly useful as insulating or dielectric media in submarine, telephone and telegraph cables, high frequency cables and power cables. For this purpose they may be worked as plastics by injection molding or by extrusion processes or used in solution, for coating electrical conductors, or for the manufacture of condensers. The present plasticized polystyrenes are highly resistant to acids and alkalies and are, therefore, advantageously employed when dissolved in organic solvents as acid and alkali resistant coatings. Films of the plasticized polystyrene may be used as tank lining material in the chemical process industries or for lining food containers. Because of the flexibility and toughness, the plasticized polystyrene is also suitable for making golf ball coverings, water-proof wearing apparel and shower curtains. Films cast from solutions or emulsions of the plasticized polystyrene are advantageously employed as wrapping and packaging materials, particularly for the protection of fresh foods by the vacuum packing process.

The invention is further illustrated, but not limited, by the following examples:

*Example 1*

*Preparation of polystyrene.*—A mixture consisting of 200 g. of monomeric styrene, 522 g. of water, 1.056 g. of potassium persulfate and 10.4 g. of a sodium stearate soap known as Ivory Snow was heated with mechanical agitation at a temperature of 50° C. for 16 hours. At the end of this time the monomeric styrene has been practically completely polymerized and the resulting product comprises an emulsion of polymeric styrene. Various other oxygen yielding polymerization catalysts may be employed with the same result.

*Preparation of an emulsion of a styrene-butadiene interpolymer.*—200 g. of a mixture consisting of 75 parts by weight of monomeric styrene and 25 parts by weight of butadiene was emulsified in 500 g. of water containing 10 g. of soap, 1 g. of potassium persulfate and 0.5 g. of dodecyl mercaptan. The emulsion was polymerized by heating to 50° C. for 16 hours. At the end of this time, the small amount of unpolymerized monomeric material remaining in the mixture was removed by distillation.

*Preparation of plasticized polystyrene.*—The emulsified interpolymer prepared as described above was slowly added in the cold and with constant stirring to the polystyrene emulsion obtained as described above. Stirring was continued for approximately 10 minutes after addition of the copolymer emulsion had been completed. The resulting emulsion was then added to 2,000 g. of hot ethanol and the hard, powdery material which was thereby precipitated was filtered, washed with water and dried. Compression molded test specimens of the product thus obtained by molding at a temperature of 150° C., a pressure of 2,000 p. s. i. were found to have the following properties:

Tensile Strength _____ 3,610 p. s. i.
Elongation _____ 180%

The above values for tensile strength and elongation were determined on a Scott J–2 tester using the compression molded tensile specimens with a 1.5" straight section in the center, the cross section of the straight portion being 0.1" x 0.5". The Scott J–2 tester was used with a cross head speed of 1" per minute.

In order to show the difference between the plasticized polystyrene of this example and either polymeric styrene or a styrene (75)-butadiene (25) copolymer, the following experiments were performed:

The emulsion of polystyrene prepared in this example was precipitated by addition of hot ethanol thereto, the precipitated powdery polystyrene was washed, dried and then compression molded. Evaluation of the molded test specimen thus obtained by the testing procedures herein described showed a value of 5,280 p. s. i.

and an elongation of 1.4%. This material, while possessing a high tensile strength, has a very low elongation.

A sample of the emulsion of styrene (75)-butadiene (25) interpolymer prepared as above was also precipitated by addition of hot ethanol thereto, the precipitate was washed and dried and subsequently compression molded. Upon evaluation of the resulting molded test specimen by the procedures herein described, it was found that it had a tensile strength of only 1,310 p. s. i. and an elongation of 430%. Hence, while this material has very good elongation, its tensile strength is very poor. That the results obtained are due essentially to the presence of a physical mixture and that no molecular interpolymerization between the polystyrene and the interpolymer is involved or is desirable, was shown by using the same amounts of materials present in this example as monomeric materials. Thus, when a mixture of 87.5 parts by weight of styrene and 12.5 parts by weight of butadiene was interpolymerized in the manner previously described, and the product was coagulated by means of alcohol and dried, a non-flexible styrene-like product was obtained having a tensile strength of 4,600 p. s. i. and an elongation of only 1.4%.

The plasticized polymeric styrene prepared as herein described is a homogeneous material in which the styrene-butadiene interpolymer, while only physically combined therein, neither volatilizes therefrom at increased temperatures, nor separates out at very low temperatures. It is a clear, transparent material which evidences no lack of either compatibility or complete interpenetration. The plasticized polystyrene of this invention is soluble in benzene, ethylene dichloride and xylene, and substantially unaffected by ethanol, other lower aliphatic alcohols and gasoline. When solutions of the plasticized polystyrene are applied to cloth, wood or metal surfaces, they give glossy, clear, adherent films of good color. Solutions of the present plasticized polystyrene may also be cast into films or ribbons, which materials may be advantageously employed as transparent, water-proof wrapping materials. Ribbons or tapes of the plasticized styrene resin may also be obtained by the extrusion process and coated wires, for example, for electrical insulation may also be manufactured by extruding the copolymer upon wires, cables, etc.

Example 2

In this example the emulsion of polystyrene and the emulsion of styrene (75)-butadiene (25) interpolymer, both prepared as described in Example 1, were mixed in such proportions as to produce a mixture containing 80 parts by weight of polystyrene and 20 parts by weight of the interpolymer. Precipitation of the resulting mixture by addition of ethanol thereto, followed by filtration and drying of the resulting precipitate gave a substantially transparent, granular material which was then subjected to compression molding as described in Example 1. Evaluation of molded test specimens thus obtained by the methods described in Example 1 gave a tensile strength value of 4,800 p. s. i. and an elongation of 2.4%. This plasticized copolymer, while not quite as flexible as that obtained by Example 1, nevertheless shows a considerably improved flexibility over polymeric styrene and may be employed for many applications in which the brittleness of polystyrene is a disadvantage.

Example 3

A polystyrene emulsion prepared as in Example 1 was precipitated by addition of ethanol thereto and the precipitated polymer was washed and dried. The styrene-butadiene interpolymer emulsion of Example 1 was also precipitated and the interpolymer powder washed and dried. The two dried materials were mixed together in a Banbury mixer employing proportions of polystyrene and the copolymer in a 65:35 weight ratio. After thorough homogenization, the material was removed from the mixer and an aliquot sample of the same was compression molded at a temperature of 150° C., and a pressure of 2,000 p. s. i. for 10 minutes. Molded test specimens so obtained were evaluated by the testing methods described in Example 1 and the product was found to possess a tensile strength value of 4,000 p. s. i., and an elongation of 90%. Instead of employing a Banbury mixer, other mixing machines such as the Werner-Pfleiderer mixer may be used or the mechanical mixing may be effected on a rubber mill at ordinary temperatures. Materials obtained by employing either of these two mixing procedures have substantially the same properties as those obtained when mixing was carried out in the Banbury mixer.

Example 4

A mixture consisting of 60 parts by weight of monomeric styrene and 40 parts by weight of butadiene was subjected to emulsion polymerization substantially as described in Example 1 for the polymerization of the 75-25 mixture of styrene and butadiene. The emulsion of interpolymer thus obtained was slowly added with stirring at room temperature to the emulsion of polystyrene prepared in Example 1, employing such proportions of the interpolymer emulsion to styrene emulsion so that the ratio of interpolymer to styrene present was 1:4. The mixture was agitated for 15 minutes after addition of the interpolymer had been completed and then precipitated by addition to hot ethanol. After filtering, washing and drying the precipitated plasticized polystyrene, the powdery material thus obtained was subjected to compression molding at a temperature of 150° C., pressure of 2,000 p. s. i. for 10 minutes. Upon evaluation of the molded test specimens thus obtained, the product was found to possess a tensile strength of 4,000 p. s. i. and an elongation of 4.3%.

Example 5

In this case there is employed a polystyrene emulsion prepared as in Example 1 and the interpolymer emulsion obtained as in Example 4. The two emulsions were mixed in such proportions that the resulting mixture contained an interpolymer to styrene ratio of 2:3. Precipitation of the resulting resin by addition of ethanol thereto gave a powdery product which, upon filtration, washing and drying was molded to give an object having a tensile strength of 3,200 p. s. i. and an elongation of 225%, as determined by the testing procedures described in Example 1.

Example 6

*Preparation of an emulsion of styrene-isoprene interpolymer.*—200 g. of a mixture consisting of 70 parts by weight of monomeric styrene and 30 parts by weight of isoprene was emulsified in 500 g. of water containing 10 g. of soap, 1 g. of potassium persulfate and 0.5 g. of dodecyl mercaptan. The emulsion was polymerized by heating to 50°

C. for 16 hours. At the end of this time, any monomeric material remaining in the mixture was removed by distillation.

*Preparation of plasticized polystyrenes.*—The emulsion of polystyrene prepared in Example 1 and the emulsion of styrene-isoprene interpolymer of this example were mixed in the proportions indicated below. Films cast from the resulting mixtures were hard and transparent and showed the following characteristics:

| Parts by Weight of Interpolymer Emulsion | Parts by Weight of Polystyrene Emulsion | Characteristics of Films |
|---|---|---|
| 10 | 90 | Brittle. |
| 30 | 70 | Slightly flexible. |
| 40 | 60 | Flexible. |
| 50 | 50 | Do. |
| 60 | 40 | Very flexible. |
| 70 | 30 | Do. |

The resinous products are workable at temperatures of 100° C. to 200° C. by extrusion; they can be compression molded at temperatures of from 125° C. to 200° C. and can also be readily formed into fibers and filaments. The high ratio styrene-butadiene or styrene-isoprene interpolymers, as has been herein shown, act as non-volatile plasticizers and form upon simple mechanical admixture with polystyrene homogeneous, transparent materials of improved flexibility and good strength. While in the above example the polymer employed in preparing the plasticized products was obtained by the emulsion procedure, other polymerizing methods may be employed for the preparation of the polystyrene. Particularly when the plasticized product is to be made by mixing the polymer and the interpolymer in the solid state as, for example, by mixing in a Banbury mixer, the polymeric styrene is advantageously prepared by mass polymerization, the solid product thus obtained being finely comminuted before being mixed with the finely divided interpolymer.

Polymerization of styrene, itself, or of mixtures of styrene and the conjugated diene may be carried out in the presence or absence of polymerization catalysts. Formation of emulsions of styrene and butadiene or isoprene may be assisted by emulsifying agents or they may be produced by mechanical agitation in the absence of chemical emulsification agents.

What I claim is:

1. A moldable polystyrene composition consisting of from 50% to 60% by weight of a solid homopolymer of styrene, the balance thereof being a styrene-conjugated diene interpolymer, said interpolymer consisting of from 75% to 60% of styrene and from 25% to 40% by weight of a conjugated diene selected from the class consisting of butadiene and isoprene said interpolymer having been formed in aqueous emulsion.

2. A moldable polystyrene composition consisting of 50% by weight of a solid homopolymer of styrene mixed with 50% by weight of an interpolymer formed in aqueous emulsion and consisting of 75% by weight of styrene and 25% of butadiene.

3. A moldable polystyrene composition consisting of 60% by weight of a solid homopolymer of styrene mixed with 40% by weight of an interpolymer formed in aqueous emulsion and consisting of 60% by weight of styrene and 40% of butadiene.

RAYMOND B. SEYMOUR.

REFERENCES CITED

The following references are of record in the file of this patent:

UNITED STATES PATENTS

| Number | Name | Date |
|---|---|---|
| 2,317,858 | Soday | Apr. 27, 1943 |
| 2,335,124 | Konrad | Nov. 23, 1943 |
| 2,356,965 | Allison | Aug. 29, 1944 |
| 2,388,685 | Guss et al. | Nov. 13, 1945 |

FOREIGN PATENTS

| Number | Country | Date |
|---|---|---|
| 456,442 | Great Britain | 1936 |
| 588,785 | Germany | Nov. 27, 1933 |

OTHER REFERENCES

Bacon et al. Proceedings of Rubber Technology Conference, London 1938, pages 525–529.